No. 717,748. PATENTED JAN. 6, 1903.
A. IVON.
TRAVELER FOR SPINNING FRAMES.
APPLICATION FILED NOV. 18, 1901.
NO MODEL. 3 SHEETS—SHEET 1.
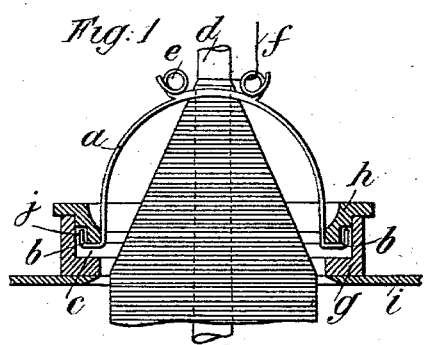
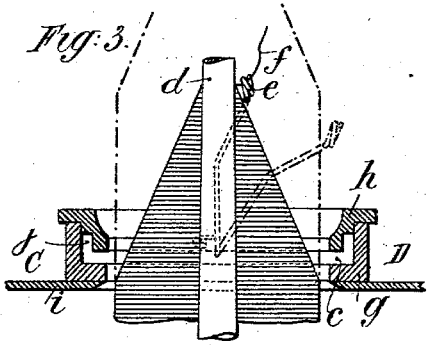
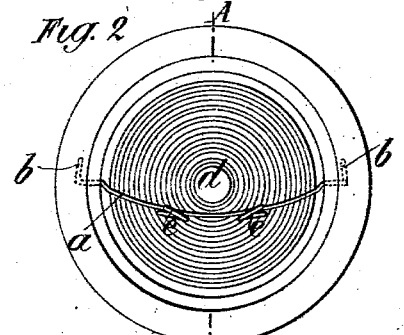
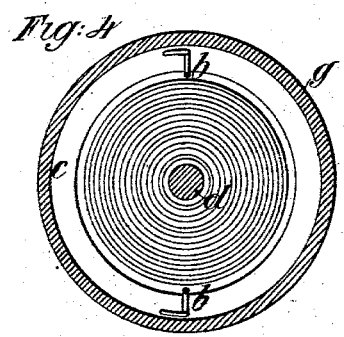
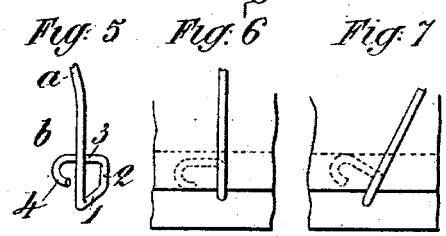
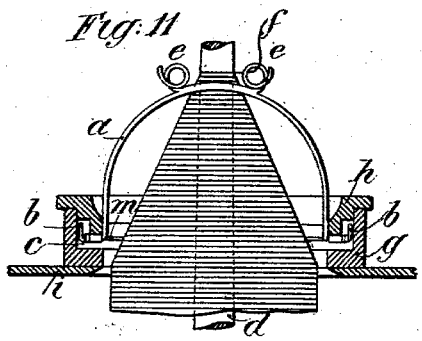
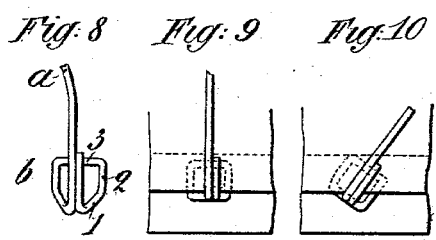
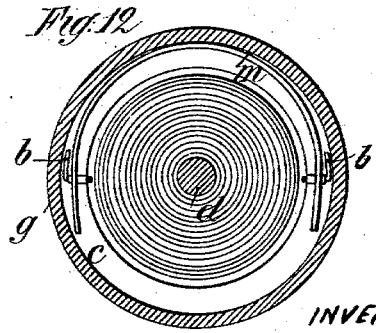
WITNESSES:
F. W. Wright
S. C. Connor
INVENTOR
ALEXANDRE IVON
BY Howson and Howson
HIS ATTORNEYS.

No. 717,748. PATENTED JAN. 6, 1903.
A. IVON.
TRAVELER FOR SPINNING FRAMES.
APPLICATION FILED NOV. 18, 1901.
NO MODEL. 3 SHEETS—SHEET 2.
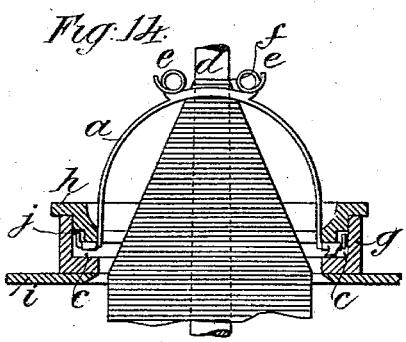
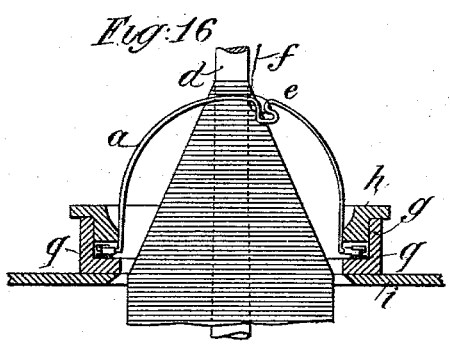
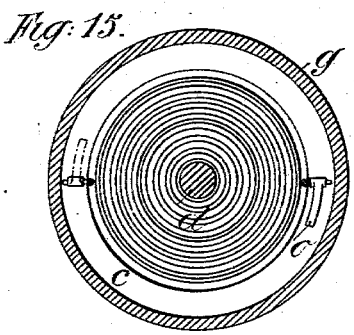
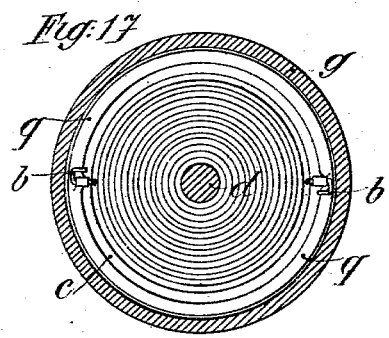
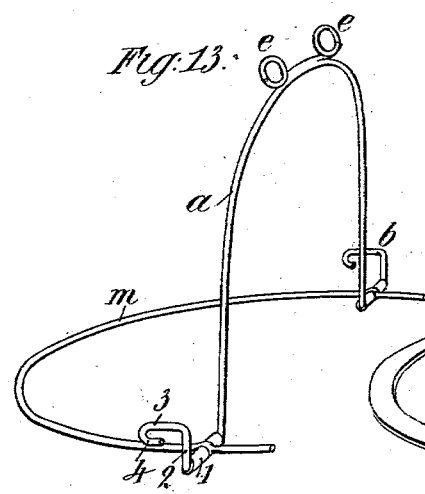
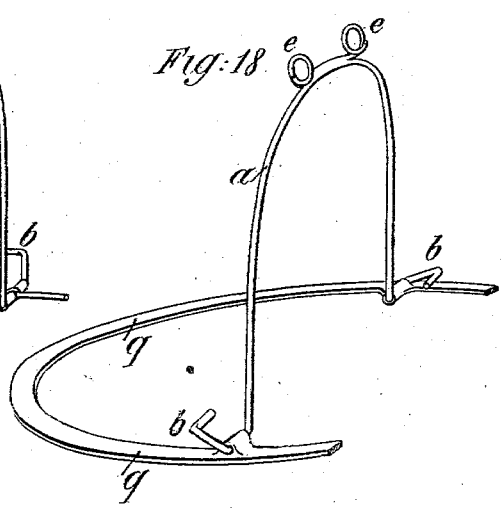
WITNESSES:
P. W. Wright
S. C. Connor
INVENTOR
ALEXANDRE IVON
BY Howson and Howson
HIS ATTORNEYS No. 717,748. PATENTED JAN. 6, 1903.
A. IVON.
TRAVELER FOR SPINNING FRAMES.
APPLICATION FILED NOV. 18, 1901.
NO MODEL. 3 SHEETS—SHEET 3.
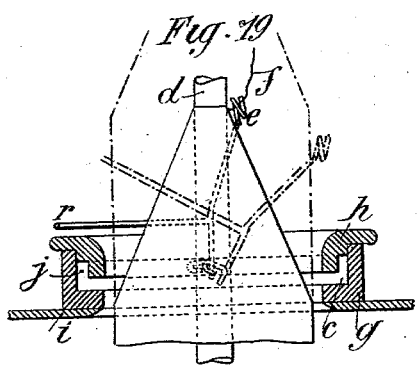
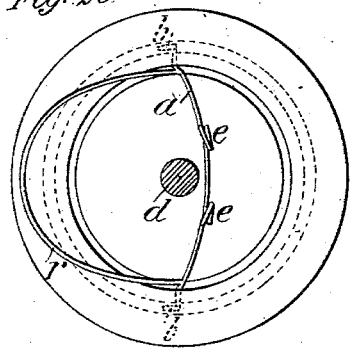
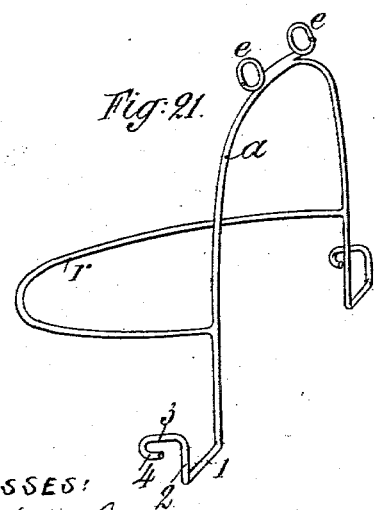
WITNESSES:
INVENTOR
ALEXANDRE IVON
BY
HIS ATTORNEYS

UNITED STATES PATENT OFFICE.

ALEXANDRE IVON, OF PARIS, FRANCE, ASSIGNOR OF ONE-HALF TO A. FOURNIVAL ET LACAILLE, OF RETHEL, ARDENNES, FRANCE, A FIRM.

TRAVELER FOR SPINNING-FRAMES.

SPECIFICATION forming part of Letters Patent No. 717,748, dated January 6, 1903.

Application filed November 18, 1901. Serial No. 82,709. (No model.)

*To all whom it may concern:*

Be it known that I, ALEXANDRE IVON, a citizen of the Republic of France, residing in Paris, France, have invented certain new and useful Improvements Relating to the Spindles of Winding-Frames and the Like, of which the following is a specification.

This invention relates to spindles for spinning or winding frames and the like, and has for its object to provide an improved traveler for such continuous spinning-frames, winding-frames, and the like whereby the action of centrifugal force tending to throw the upper part of the traveler out away from the revolving cop is counteracted first by the tension of the thread itself and when it becomes necessary by the further intervention of an auxiliary brake in such a manner as to render possible the use of a ring of approximately the same diameter as that of the cops which are to be wound, thereby permitting a greater number of spindles for a given length of the frame.

In order that the invention may be readily understood, I will describe the same with reference to the accompanying drawings, in which—

Figure 1 is an elevation, partly in section, of my improved traveler embodying this invention. Fig. 2 is a corresponding plan. Fig. 3 is a section taken on the line A B of Fig. 2 as seen from the side. Fig. 4 is a horizontal section taken on the line C D of Fig. 3. Figs. 5, 6, and 7 are details hereinafter referred to. Figs. 8, 9, and 10 show a modified construction of the parts shown in Figs. 5 to 7. Figs. 11 to 21 show modified constructions of traveler.

The traveler shown in Figs. 1, 2, 3, and 4 is composed of a metal wire $a$, bent to a semicircle, or nearly so, the extremities of which are formed with hooks $b\,b$, which are engaged in an annular groove $c$ of a ring, through the center of which passes the spindle $d$, upon which the cop is formed in the ordinary manner. The top portion of the traveler $a$ is slightly cambered or set out of center, Fig. 2, in such a manner as to apply itself as accurately as possible to the periphery of the cop, eyes $e\,e$ being also provided for the passage of the thread $f$ being wound upon the spindle $d$ to form the cop.

The ring which supports the traveler is preferably made in two parts $g$ and $h$, one part of which is fixed direct to the plate $i$ of the machine or through the intervention of a plate for use in centering it with reference to the corresponding spindle, while the other part is adjusted and fixed upon the former in any convenient manner, provided it is such as to form the groove $c$ previously mentioned.

The hooks $b\,b$ (shown in detail in Fig. 5) comprise each a horizontal portion 1, a vertical portion 2, and a horizontal portion 3, which stands at right angles to the part 1 and in an elevated plane and terminates with a short rearwardly-curved portion 4. The two hooks of the traveler are disposed in the same direction. Their vertical portions 2 2 engage in the recess $j$, extending upward and forming the continuation of the circular groove $c$, this arrangement being for the purpose of preventing the unintentional escape of the traveler. The parts 3 3 are designed to rub against the top surface of the recess in which they are housed and to form a brake upon this surface, Fig. 7, directly the traveler assumes the inclined position, (shown in Fig. 3,) while before arriving in this position the contact or brake action does not exist. (See Fig. 6.) In all cases the traveler participates in the movements of the rise and fall of the ring before mentioned, which motions may be obtained by any appropriate known means which permit the greatest mobility of lateral inclination with reference to the axis of the spindle $d$, as also around the latter. The spindle $d$ in revolving in the ordinary manner moves with it the thread $f$, which pulls the traveler $a$ with it, and the latter is thus held by the thread against the cop or bobbin, while it is at the same time retained by the ring by means of the hooks $b\,b$. The aforementioned brake-like action neutralizes the action of centrifugal force and insures the tension of the thread by aiding in keeping the contact of the upper part of the traveler against the cop or bobbin being wound.

With the form of hook shown in Fig. 5 the rotation of the traveler can only be effected in one direction, and in order to permit of the rotation of the same in both directions and yet produce the same brake action the hooks are constructed as shown in Fig. 8. According to this construction each hook is provided with two branch ends symmetrically disposed with respect to the plane of the traveler, and each such branch has an angular portion 1, a vertical portion 2, and a horizontal portion 3, in the manner hereinbefore explained. The extremities of the horizontal portion 3 of both branches of the traveler are brought into action according to the direction of rotation, as will be understood from Fig. 10, while Fig. 9 shows the position without brake action.

Obviously the metal of which the traveler is made may be steel, aluminium, or other suitable metal in the form, for example, of a wire of any convenient section—circular, polygonal, or star-shaped—and also that the eyes $e\ e$, through which passes the thread being wound, may be separately secured to the traveler, or they may be formed by bending the wire constituting the traveler, as indicated in Fig. 2. In any case the traveler may be modified in form as long as the special feature of its construction is not altered. The following are some forms of modifications shown by way of an example.

Figs. 11, 12, and 13 show the extremities of the traveler connected to a semicircular band or the like $m$, while nevertheless the ends are formed into hooks for use as a means for engagement and for the production of a brake-like action. By reason of this semicircle any tendency of the traveler to become twisted is obviated. The hooks are thus retained in a diametral line passing through the axis of the spindle $d$.

Figs. 14 and 15 show a traveler in which each of the extremities on the hooks are formed with a horizontal and a vertical portion similar to 1 and 2, before mentioned. The vertical portions serve to retain the traveler in the ring, and the horizontal portions are fitted with spring-blades $o$, rigidly fixed. These spring-blades are disposed in opposite directions and are designed to produce a brake-like action like the before-mentioned horizontal portions 3, only that they act against the lower surface of the circular groove $c$.

Figs. 16, 17, and 18 show the traveler pivoted to a flat circular strip $q$ of thin metal planed in the groove $c$ of the ring, in which it is adapted to easily move. Each extremity of the traveler is formed with a horizontal portion and also with a slightly-oblique portion which terminates with a small rearwardly-bent angular portion. The strip $q$ rests upon the lower surface of the groove $c$. When the traveler is inclined, the oblique portion at its extremities presses upon the strip $q$ and causes the same to produce a brake action upon the lower face of the groove.

Figs. 19, 20, and 21 show a modification in which the legs or branches of the traveler are connected together by a semicircle $r$, almost horizontal, and which owing to its being situated above the ring acts as a counterweight and equilibrates the centrifugal force which acts on the traveler $a$, tending to throw it outward. This semicircle also serves to impart rigidity to the traveler in a similar manner as the semicircle $m$.

I claim as my invention—

1. A traveler for spinning-frames, consisting of an arched wire, eyes for the passage of thread in the upper part of the arch, upturned hooked ends to the wire, and a ring with a downwardly-opening groove, said hooked ends being so secured in said groove as to be normally free of the top of the groove, and said traveler being adapted to be pivotally moved as the diameter of the top increases, and adapted to then cause the ends to bear on the groove, substantially as described.

2. A traveler for spinning-frames, consisting of an arched wire, eyes thereon, a grooved ring, and upturned hooked ends to the wire, said hooked ends being pivotally mounted diametrically opposite within the ring and adapted when pivoted to cause said ends to come into contact with the top of the groove and rotatable independently of the ring, substantially as described.

3. A traveler for spinning-frames, consisting of an arched wire, eyes thereon, upturned hooked ends therefor, and a downwardly-opening grooved ring, said ends being frictionally held within the groove and adapted to pivot therein to cause said ends to abut against the top of the groove, substantially as described.

4. A traveler for spinning-frames, consisting of an arched wire, eyes thereon, hooked ends having a brake part 3, and a grooved ring, said hooked ends being frictionally held in the groove and adapted to pivot therein, substantially as described.

5. A traveler for spinning-frames, consisting of an arched wire, eyes thereon, a ring having a groove opening downwardly, and hooked upturned ends to the arched wire adapted to pass up into the downwardly-opening groove to hold the wire pivotally therein, to be free of the top of the groove except when the wire is pivotally displaced, substantially as described.

6. In combination with a spindle, a traveler for spinning-frames, consisting of an arched wire bent outwardly from the spindle and having eyes, a grooved ring, and hooked upturned ends to the wire, secured in the groove and adapted to pivot therein, to cause the ends to come into contact with the top of the groove as the diameter of the cop increases.

7. A traveler for spinning-frames, consisting of an arched wire, eyes thereon, a ring having a groove, hooked ends to the wire secured in the ring-groove, and a brake means on the hook adapted to brake in the ring-groove upon the pivotal movement of the wire traveler, substantially as described.

8. A traveler for spinning-frames, consisting of an arched wire, eyes thereon, and a ring having a groove opening downwardly, hooked ends of the wire in the groove carrying braking parts, said braking parts being adapted to be operated upon the pivotal movement of the arched wire, substantially as described.

9. A ring-spinner, consisting of two concentric superposed rings, so recessed that when the top one is placed within the bottom one, a groove will be formed opening downward, in combination with an arched wire having eyes on its upper part and upturned hooked ends, having a brake part 3 in the groove formed, substantially as described.

10. A ring-spinner, consisting of a ring with a downwardly-opening groove, in combination with an arched-wire traveler, and hooked upturned ends to the wire, said ends being pivotally mounted in an annular part within the groove and diametrically opposite, substantially as described.

11. A ring-spinner, consisting of a ring with a groove, in combination with an arched-wire traveler, and hooked ends to the wire, having a brake part adapted to brake in the groove on the pivotal movement of the traveler and a curved part from one side of the wire to the other, substantially as described.

12. A ring-spinner, consisting of a ring with a groove, in combination with an arched-wire traveler, hooked ends to the wire, having a brake adapted to brake on the pivotal movement of the traveler, and a curved part pivotally secured to the arched-wire ends within the groove, substantially as described.

In testimony whereof I have signed my name to this specification in the presence of two subscribing witnesses.

ALEXANDRE IVON.

Witnesses:
LÉON FRANCKENS,
EDWARD P. MACLEAN.